United States Patent
Patthey

(10) Patent No.: US 10,161,532 B2
(45) Date of Patent: Dec. 25, 2018

(54) PINCH VALVE ASSEMBLY

(71) Applicant: ETHIMEDIX SA, Les Acacias (CH)

(72) Inventor: Rene Patthey, Morges (CH)

(73) Assignee: ETHIMEDIX SA, Les Acacias (CH)

( * ) Notice: Subject to any disclaimer, the term of this patent is extended or adjusted under 35 U.S.C. 154(b) by 27 days.

(21) Appl. No.: 15/511,679

(22) PCT Filed: Oct. 6, 2014

(86) PCT No.: PCT/IB2014/065088
§ 371 (c)(1),
(2) Date: Mar. 16, 2017

(87) PCT Pub. No.: WO2016/055831
PCT Pub. Date: Apr. 14, 2016

(65) Prior Publication Data
US 2017/0292618 A1    Oct. 12, 2017

(51) Int. Cl.
*F16K 7/04*     (2006.01)
*F16K 31/06*    (2006.01)

(52) U.S. Cl.
CPC .......... *F16K 7/045* (2013.01); *F16K 31/0675* (2013.01)

(58) Field of Classification Search
CPC ............................ F16K 7/045; F16K 31/0675
USPC ....................................................... 251/4, 7
See application file for complete search history.

(56) References Cited

U.S. PATENT DOCUMENTS

| | | | | |
|---|---|---|---|---|
| 2,355,232 A | * | 8/1944 | Nelson ................... | H01M 6/08 251/7 |
| 2,645,245 A | * | 7/1953 | Maisch ................. | B01L 3/0203 251/7 |
| 2,842,331 A | * | 7/1958 | Anderson ............... | F16K 7/045 251/6 |
| 2,979,931 A | * | 4/1961 | Hubbard ................. | D06F 39/02 25/7 |

(Continued)

FOREIGN PATENT DOCUMENTS

| DE | 10 2008 031 727 A1 | 1/2009 |
|---|---|---|
| DE | 10 2011 000 430 A1 | 8/2012 |

(Continued)

OTHER PUBLICATIONS

International Search Report, dated Jun. 25, 2015, from corresponding PCT application.

*Primary Examiner* — Eric Keasel
(74) *Attorney, Agent, or Firm* — Young & Thompson

(57) ABSTRACT

A pinch valve assembly for use in fluidic applications has an inlet and outlet with a flexible conduit therebetween, a base plate attached to a housing maintaining in its upper part an electromagnet. The valve assembly further includes a pinch unit assembly including in its lower external surface a knife, the pinch unit assembly being axially moveable around the body of the electromagnet between a rest position in which the knife pinches the flexible conduit when the electromagnet is not energized and an open position in which the knife releases the flexible conduit when the electromagnet is energized. It further includes an elastic unit urging the pinch unit assembly against the base plate. The electromagnet is energized in phases, first with a high level of energy during a short time and second with an energy ten times less than that provided in the first phase to maintain the valve open.

20 Claims, 5 Drawing Sheets

(56) References Cited

U.S. PATENT DOCUMENTS

| | | | | |
|---|---|---|---|---|
| 3,511,469 A * | 5/1970 | Bell | ............... | F16K 7/045 251/7 |
| 4,176,671 A * | 12/1979 | Citrin | ............... | F16K 7/02 251/7 |
| 4,191,359 A * | 3/1980 | Andersson | ............... | A61M 39/284 251/9 |
| 4,230,151 A * | 10/1980 | Jonsson | ............... | F16K 7/045 251/7 |
| 4,259,985 A * | 4/1981 | Bergmann | ............... | F16K 7/045 251/7 |
| 4,491,156 A * | 1/1985 | Lee, II | ............... | F16K 7/045 251/7 |
| 4,496,133 A * | 1/1985 | Sule | ............... | F16K 7/045 251/7 |
| 4,501,405 A * | 2/1985 | Usry | ............... | F04B 43/09 251/7 |
| 4,524,802 A * | 6/1985 | Lawrence | ............... | F16K 11/027 251/7 |
| 4,921,206 A | 5/1990 | Dunstan et al. | | |
| 4,993,456 A * | 2/1991 | Sule | ............... | F16K 7/045 251/7 |
| 5,078,361 A * | 1/1992 | Nordman | ............... | F16K 7/045 251/7 |
| 5,188,334 A * | 2/1993 | Yoshii | ............... | F16K 7/045 251/7 |
| 5,190,071 A * | 3/1993 | Sule | ............... | F16K 7/045 251/7 |
| 5,203,534 A * | 4/1993 | Demarest | ............... | B05B 7/12 251/7 |
| 5,810,324 A * | 9/1998 | Eriksson | ............... | A61M 16/20 251/7 |
| 6,062,218 A * | 5/2000 | Krahbichler | ............... | A61M 16/20 128/205.24 |
| 6,079,691 A * | 6/2000 | Dragone | ............... | F16K 7/06 251/7 |
| 6,279,869 B1 * | 8/2001 | Olewicz | ............... | F16K 7/045 251/7 |
| 6,386,505 B2 * | 5/2002 | Schob | ............... | A61M 39/28 251/7 |
| 6,932,317 B2 * | 8/2005 | Gnadinger | ............... | F16K 7/045 251/129.05 |
| 7,104,275 B2 * | 9/2006 | Dille | ............... | F16K 7/045 251/7 |
| 7,740,225 B1 * | 6/2010 | Estelle | ............... | F16K 31/0665 251/129.05 |
| 7,998,121 B2 * | 8/2011 | Stringham | ............... | A61M 5/142 251/4 |
| 8,166,932 B2 * | 5/2012 | Genta | ............... | F02D 41/20 123/90.11 |
| 8,376,310 B2 * | 2/2013 | Veltrop | ............... | F16K 7/04 251/7 |
| 8,622,365 B2 * | 1/2014 | Fukano | ............... | F16K 7/045 251/7 |
| 2004/0251440 A1 | 12/2004 | Gnadinger et al. | | |

FOREIGN PATENT DOCUMENTS

| | | |
|---|---|---|
| GB | 677115 A | 8/1952 |
| GB | 932736 A | 7/1963 |

* cited by examiner

PINCH VALVE ASSEMBLY

The present invention relates to a pinch valve assembly and more particularly to a pinch valve having a compact design, a small footprint and requiring low energy to be operated. Pinch valves are known devices that are used for example in fluidic application to control the flow of a liquid through a flexible conduit. The advantage of using pinch valves to open or close by compression a flexible conduit is that there are no possible contamination of the liquid flowing within the conduit as no element is in direct contact with the inside of the conduit.

The pinch valve object of the invention is a monostable valve that is closed in normal operation and opens when energized. One problem with the existing valves relates to the fact that they require energy during all the time the valve remains in open state. When such pinch valves are used in a device that may be energized through a standard source of power, the amount of required energy is not a problem. However when such valves are used in a battery operated device, energy may rapidly become a major concern as the battery has a limited amount of energy to actuate the valve.

For example a battery operated portable container intended to deliver doses of liquid may run out of energy after a number of cycles.

It is therefore an object of the present invention to provide a pinch valve assembly that may be installed in portable battery operated devices and that requires only a fraction of the energy needed by conventional pinch valves. Another object of the invention is to provide a pinch valve assembly that is compact, simple and not expensive to manufacture. Most of the existing pinch valves have numerous components and their final assembly and testing is costly and time consuming.

To this end there is provided a pinch valve having the characteristics recited in claim 1.

Other features and advantages of the present invention will become apparent from the reading of the following detailed description made with reference to the accompanying drawings in which.

Figure 1:
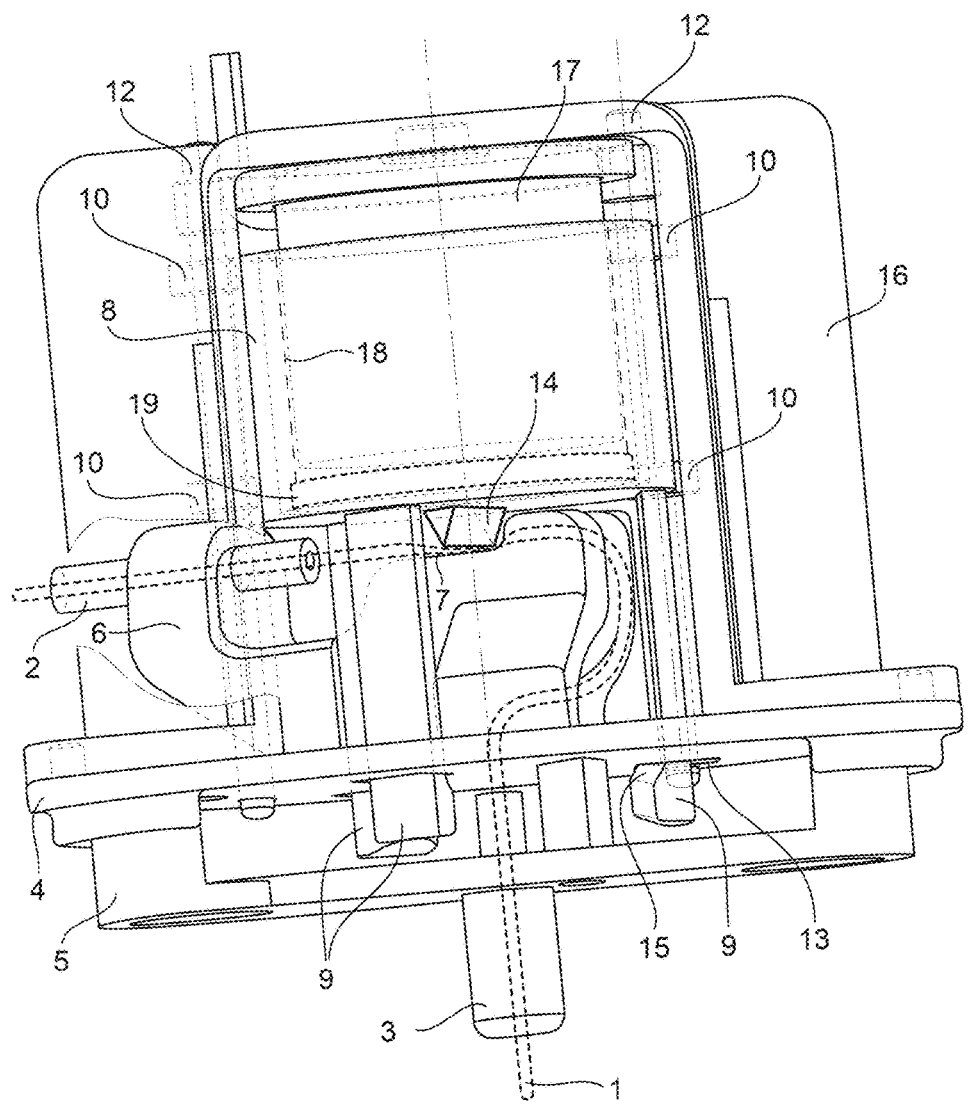
FIG. 1 is a perspective view of the pinch valve according to the present invention, when the valve is in closed position.

With reference to FIG. 1, there is shown a pinch valve according to the present invention that allows the control of the flow of a liquid passing through a flexible conduit 1 from an entry point or inlet 2 to an outlet 3.

This assembly comprises a base plate constituted of an upper part 4 bearing a guiding element 6 for the flexible conduit 1 connecting the inlet 2 to the outlet 3 and a lower part 5 connected to the upper part 4. The guiding element 6 shown as an example allows a lateral inlet 2 for the flexible conduit 1 and a vertical outlet 3 located under the base plate of the whole assembly. It is evident that other configurations are possible depending on the requirement of the placement of the inlet and the outlet, for example an inlet and an outlet located laterally in the same plane.

The flexible conduit 1 is guided by the guiding element toward a flat surface 7 of the guiding element 6 underneath a pinch element assembly 8 which comprises a hollow upper cylindrical body connected to two or more elastic legs 9. In the embodiment represented, the cylindrical body has three elastic legs equally spaced on its circumference and extending downwardly through holes 13 in a space located between the two parts 4, 5 forming the base plate. In alternate embodiments there may be provided two elastics legs or even more than three legs.

The external surface of the cylindrical body of the pinch element assembly 8 is provided with upper and lower guiding elements 10 for axially guiding the pinch element assembly 8 along axles 12 that are rigidly connected to the base plate 4,5. The pinch element assembly 8 may then move axially between a rest position in which the elastic legs 9 are clipped into corresponding holes 13 of the upper part 4 of the base plate and a working position, shown at FIG. 2, in which the elastic legs 9 emerge partially from the holes 13 of the base plate 4,5.

On the outer bottom surface of the cylindrical body of the pinch element assembly 8, there is arranged a knife 14 that protrudes downwardly in direction of the flat surface 7 of the guiding element 6. When the pinch element assembly 8 is in rest position, as shown at FIG. 1, the knife 14 is urged against the flexible conduit 1 installed on the guiding element 6 thanks to the force exerted downwardly by the elastic legs 9, thus preventing the fluid to flow through the flexible conduit 1.

The flexible legs 9 are, by design, biased radially toward the centre of the vertical axis of the valve body, as such they must be spaced outwardly to engage the holes 13 in the base plate. Once installed in the holes 13 of the base plate 4,5, the inclined face 15 of the extremities of the legs 9 exerts a resulting force downwardly. The extremities of the legs 9 are configured with an inclined surface 15 abutting against the edge of the holes 13 of the base plate. When a force is exerted vertically in the opposite direction on the pinch element assembly 8, the legs 9 will diverge and the inclined faces 15 of the extremities of the legs 9 will slide against the edges of the holes 13 of the base plate allowing a movement of the pinch element assembly 8 in the vertical direction.

The pinch valve assembly further comprises a housing 16 which is firmly fixed to the upper part 4 of the base plate and that maintains in its upper part the upper top portion of an electromagnet 17. The lower part of the electromagnet 17 extends downwardly within the hollow upper portion of the pinch element assembly 8. Preferably, the inner part of hollow upper part of the pinch element assembly 8 comprises longitudinal ribs 18 guiding and maintaining the electro-magnet 17 centred within the hollow part of the pinch element assembly 8 with a minimal play.

Figure 2:
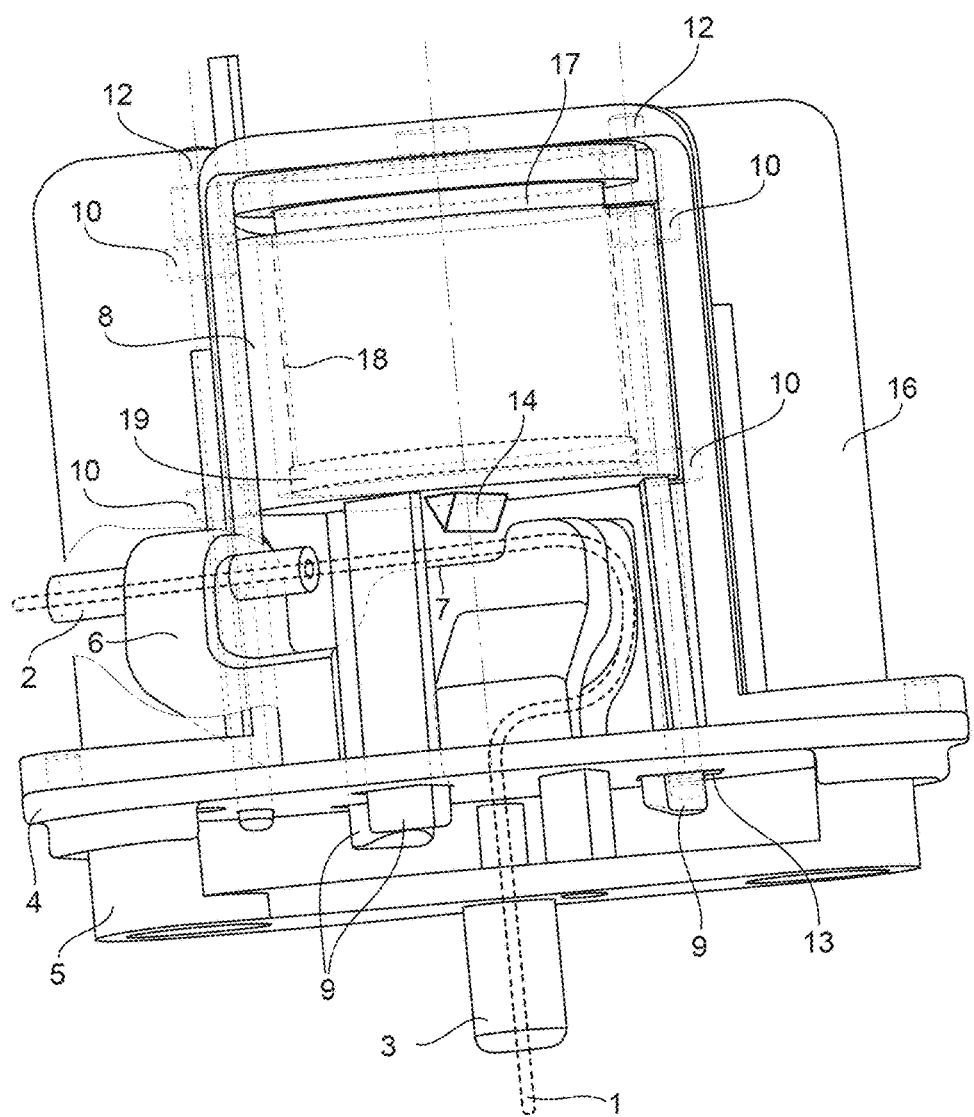
FIG. 2 is a perspective view of the pinch valve in open position.
Figure 3:
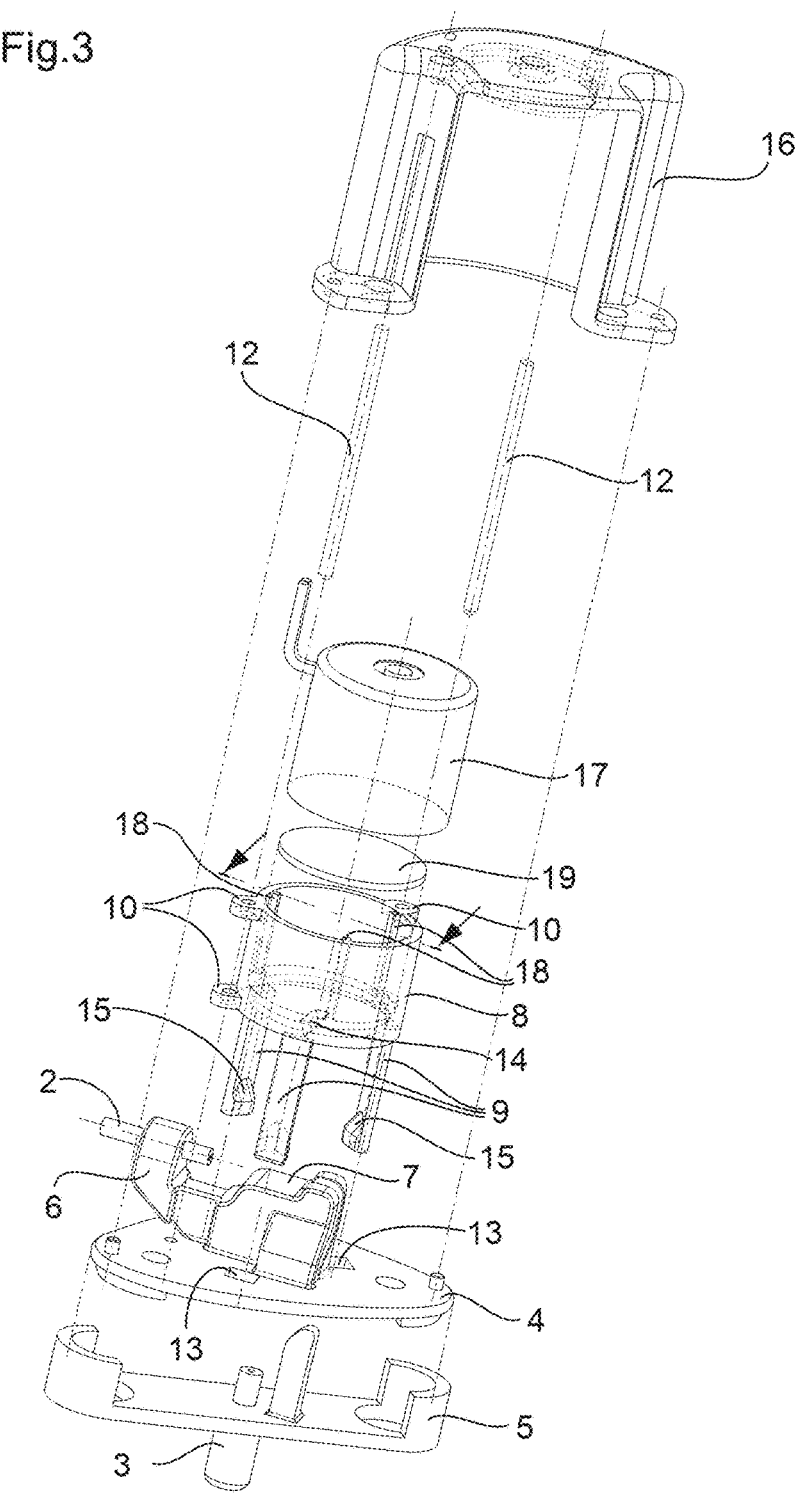
FIG. 3 is perspective exploded view of all the components of the pinch valve according to the invention.

Once assembled, as described before, the pinch element assembly 8 may move axially upwardly and downwardly around the body of the electro magnet 17 while being guided internally by the ribs and externally thanks to the axles 12 and the guiding elements 10 located on the upper and lower parts of the external surface of the cylindrical body of the pinch element assembly 8. Thanks to this guiding, the displacement of the pinch element assembly 8 between its resting position shown at FIG. 1 and its working position shown at FIG. 2 is precisely controlled.

Figure 4:
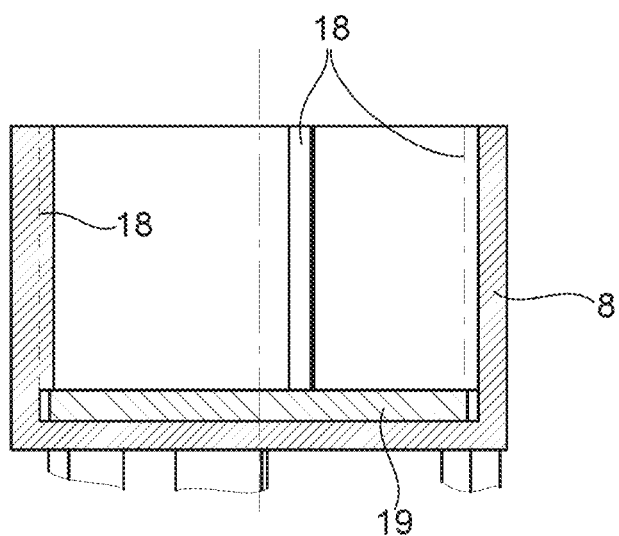
FIG. 4 is a cross sectional view of the pinch element assembly along the line indicated at FIG. 3.

Now referring back to FIGS. 1, 2, and 4, a disk 19 made of ferro magnetic material is located in the bottom of the hollow cylindrical part of the pinch element assembly 8 under the guiding ribs 18. This metallic disk 19 is installed and firmly maintained by the lower extremity of the guiding ribs 18 against the bottom of the hollow body of the pinch element assembly 8. The lower surface of the disk 19 lies on the bottom of the hollow cylindrical part of the pinch element assembly 8 and its upper surface is located near the bottom surface of the electromagnet 17. The gap between the lower portion of the electromagnet and the disk 19 is kept to a minimum that determines the maximum vertical displacement of the mobile pinch element assembly 8. When the electromagnet 17 is energized, it exerts an attractive force on the metallic disk 19 in the upper direction. As the metallic disk 19 is firmly fixed within the pinch element assembly 8, the whole pinch element assembly 8 will move upwardly until the metallic disk 19 is scotched against the lower surface of the electromagnet 17. The force to be exerted by the electromagnet 17 is adjusted to be higher than the retaining force of the elastic legs maintaining the pinch element assembly 8 into the base plate 4, 5. Once the electromagnet 17 is energized, the pinch element assembly moves upwardly, disengaging the knife 14 of the surface of the flexible conduit 1 and thus allowing the fluid to flow through the flexible conduit.

Figure 5:
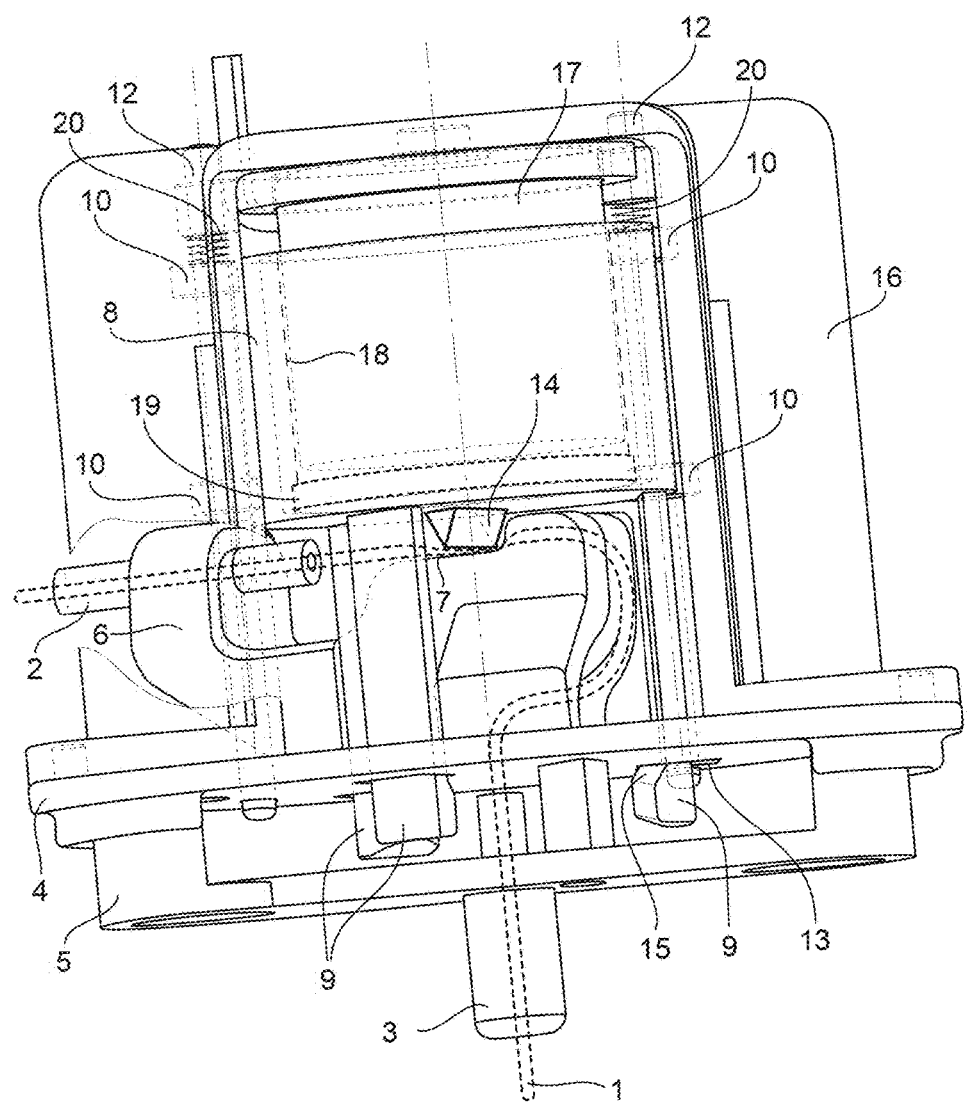
FIG. 5 is a perspective view of an alternative embodiment of the pinch valve.

FIG. 5 illustrates an alternate embodiment of the pinch element assembly 8 in which there are no elastic legs arranged to maintain it in its lower position but instead there are provided alternate elastic means to exert a force downwardly against the pinch element assembly 8. These alternate elastic means are provided in the form of coil springs 20 arranged within the housing 16, around the axles 12. As a result, the coil springs 20 urge the pinch element assembly and the knife 14 against the flexible conduit, thus preventing the liquid to flow through the conduit.

Once the current feeding the electromagnet is switched off, the elastic means (either the legs 9 or the spring coils 20) will urge the whole pinch element assembly 8 downwardly against the flat surface 7 of the guiding element 6 in the position represented at FIG. 1 thus interrupting the flow through the flexible conduit.

The electromagnet 17 is of a classical construction and consists essentially of a coil of insulated wire wrapped around a soft iron core that is magnetized only when current flows through the wire.

The electro motive force provided by the electromagnet only depends on the current energizing the wire and the number of turns of the coil around the core.

Preferably, the ferromagnetic material used for the electromagnet 17 has a very low coercivity, so that as soon as the current energizing the electromagnet returns to zero, the elastic means (coils or elastic legs) will move the pinch element assembly downward and close the valve. Typical value for the coercivity is comprised between 50 and 250 A/m.

The ferromagnetic material chosen for the electromagnet 17 and the disk 19 will, in addition to a low coercivity present strong magnetizing capabilities Typical value for the saturation magnetization is comprised between 1.3 and 2.2 Tesla. Using such a ferromagnetic material will allow the opening of the valve with a pulse of high energy during a very short time and then to maintain the valve open with an energy that is around ten time less than the energy provided during the initial pulse, thus saving considerable energy during the time the valve remains open.

One will insure that the force exerted downwardly by the elastic means on the pinch element assembly 8 is around 30% greater that the necessary force to pinch the flexible conduit so as to prevent any leakage of the fluid. The electromagnet 17 will also be dimensioned so as to provide an electromotive force that is between 25% and 50% higher that the downwardly retaining force provided by the elastic means.

Thus the valve of the present invention is a monostable valve operating in three different states. In the closed position (first state), the elastic means urge the pinch element assembly 8 against the flexible conduit, and consequently no energy is needed to maintain the valve in its stable closed state. The second state occurs when the electromagnet is energized with an initial amount of energy. Thanks to the electromagnetic properties of the magnetic circuit comprising the electromagnet and the disk 19, the disk 19 is attracted by the electromagnet and remains firmly scotched against the lower part of the electromagnet. The third state occurs during the time the valve needs to remains open. In this third state, the energy provided to the electromagnet is lowered of around a factor ten. This allows a considerable saving of energy during operation of the valve as only an initial pulse of high energy is needed to open the valve, then lower energy (around a tenth of the initial energy) is sufficient to maintain the disk 19 scotched against the lower part of the electromagnet. Typically in the foreseen fluidic application of opening the valve during a predetermined time frame to allow the distribution of a fluid in a portable battery operated drug delivery device, the following values for energizing the electromagnet 17 are as follow. Considering that the source of energy is a battery providing a voltage comprised between 2.5 and 4 volts, preferably 3.3 volts, and that the force exerted by the elastic means against the pinch element assembly is of around 2 newton, an initial pulse of current of an intensity comprised between 200 and 400 milliamps, preferably 300 milliamp and of a duration comprised between 50 and 100 milliseconds is fed to the electromagnet by the current control circuit (not represented). This allows the disk 19 installed in the pinch element assembly 8 to be attracted against the lower part of the electromagnet 17, thus disengaging the whole pinch element assembly 8 of the base plate and immediately releasing the flexible conduit pinched by the knife 14. Once this is done, the control circuit will adjust the current to about one tenth of the above mentioned values (i.e. 20 to 40 milliamps preferably 30 milliamps) during the time the valve should remain open.

The shape of the hysteresis loop tells a great deal about the material being magnetized. For the electromagnet of the present valve, a material with a strong magnetic saturation and a narrower hysteresis loop is preferred as it presents the following characteristics, higher permeability, lower retentivity, lower coercivity, lower reluctance and a lower residual magnetism.

Typically, using soft ferromagnetic material like a ferritic stainless steel such as the one known under the denomination AISI 430F is perfectly suited for the realization of the electromagnet used in the valve object of the invention.

The pinch valve of the present invention has many advantages over the existing pinch valves. Firstly it is composed of a minimal number of pieces that are easy and cheap to manufacture and to assemble. All the components, except the electromagnet and the ferromagnetic disk 19 can be made of plastic and can easily be manufactured by moulding or injection. Second, the valve is closed in its normal or rest state thus consuming no energy. Due to the properties of the ferromagnetic material used for the electromagnet, the valve needs only a short pulse of intense energy to open and around ten times less energy to remain open. Lastly, a low coercivity insures that once the electromagnet is no longer energized, the elastic means will safely close the valve, as there is a very low residual magnetism.

While the invention has been described with reference to a specific embodiment, the description is illustrative of the invention and is not to be construed as limiting the inven-

The invention claimed is:

1. A pinch valve assembly having an inlet (2) and an outlet (3) between which a flexible conduit (1) is arranged, a base plate (4,5) firmly attached to a housing (16) maintaining an electromagnet (17), further comprising a mobile pinch element assembly (8) comprising on its lower external surface a knife (14) and a metallic disk (19) in its lower inner surface forming a magnetic circuit with the electromagnet (17), and further comprising elastic means (9,20) urging the pinch element assembly (8) against the base plate (4,5); the pinch element assembly (8) being axially moveable around the electromagnet (17) body between a rest position in which the knife (14) pinches the flexible conduit (1) when the electromagnet (17) is not energized and an open position in which the knife (14) releases the flexible conduit when the electromagnet (17) is energized and wherein the electromagnet (17) is energized in two successive phases, a first phase with a high energy pulse and a second phase with an energy around ten times less than the energy provided in the first phase.

2. Pinch valve assembly according to claim 1, wherein the electromagnet (17) is dimensioned so as to provide an electromotive force that is between 25% and 50% higher than the retaining force exerted by the elastic means (9,20).

3. Pinch valve assembly according to claim 2, wherein the pinch element assembly (8) is configured as an hollow cylindrical body comprising on its external surface guiding means (10) cooperating with axles (12) rigidly fixed in the base plate (4,5) and extending upwardly within the housing (16).

4. Pinch valve assembly according to claim 2, wherein elastic means (9) are configured as elastic legs (9) protruding downwardly from the cylindrical body of the pinch element assembly (8), the extremities (15) of the elastic legs (9) being intended to cooperate with corresponding holes (13) in the base plate (4,5).

5. Pinch valve assembly according to claim 2, wherein the elastic means are configured as spring coils (20) mounted in the housing (16) around the axles (12) so as to urge downwardly the pinch element assembly (8) against the base plate (4, 5).

6. Pinch valve according to claim 2, wherein the hollow body of the pinch element assembly comprises in its inner part guiding ribs (18).

7. Pinch valve assembly according to claim 1, wherein the electromagnet (17) comprises a body holding a soft iron core wrapped around with a coil of insulated wire and wherein the body of the electromagnet, its core and the disk (19) are made of a ferromagnetic material having a low coercivity comprised between 50 and 200 A/m, and a strong saturation magnetisation comprised between 1.3 and 2.2 Tesla as well as a narrow hysteresis loop.

8. Pinch valve according to claim 1, wherein the body and the core of the electromagnet (17) as well as the disk (19) are made of soft iron stainless steel of the type AISI 430F.

9. Pinch valve assembly according to claim 1, wherein the electromagnet (17) is energized under a voltage between 2.5 and 4 volts with an initial current pulse which intensity is comprised between 200 and 400 milliamp during a duration comprised between 50 and 100 millisecond and then is energized during the duration of the desired opening of the valve with a current which intensity is comprised between 20 and 40 milliamp.

10. The pinch valve assembly of claim 9, wherein the electromagnet (17) is energized under a voltage of 3.3 volts.

11. The pinch valve of claim 10, wherein the initial current pulse intensity is 300 mA.

12. The pinch valve of claim 11, wherein the electromagnet is energized during the duration of the desired opening of the valve with a current which intensity of 30 mA.

13. Pinch valve assembly according to claim 1, wherein the pinch element assembly (8) is configured as an hollow cylindrical body comprising on its external surface guiding means (10) cooperating with axles (12) rigidly fixed in the base plate (4,5) and extending upwardly within the housing (16).

14. Pinch valve assembly according to claim 13, wherein the elastic means (9) are configured as elastic legs (9) protruding downwardly from the cylindrical body of the pinch element assembly (8), the extremities (15) of the elastic legs (9) being intended to cooperate with corresponding holes (13) in the base plate (4,5).

15. Pinch valve assembly according to claim 13, wherein the elastic means are configured as spring coils (20) mounted in the housing (16) around the axles (12) so as to urge downwardly the pinch element assembly (8) against the base plate (4, 5).

16. Pinch valve according to claim 13, wherein the hollow body of the pinch element assembly comprises in its inner part guiding ribs (18).

17. Pinch valve assembly according to claim 1, wherein the elastic means (9) are configured as elastic legs (9) protruding downwardly from the cylindrical body of the pinch element assembly (8), the extremities (15) of the elastic legs (9) being intended to cooperate with corresponding holes (13) in the base plate (4,5).

18. Pinch valve according to claim 17, wherein the hollow body of the pinch element assembly comprises in its inner part guiding ribs (18).

19. Pinch valve assembly according to claim 1, wherein the elastic means are configured as spring coils (20) mounted in the housing (16) around the axles (12) so as to urge downwardly the pinch element assembly (8) against the base plate (4, 5).

20. Pinch valve according to claim 1, wherein the hollow body of the pinch element assembly comprises in its inner part guiding ribs (18).

* * * * *